(12) United States Patent
Socky et al.

(10) Patent No.: US 8,707,032 B2
(45) Date of Patent: Apr. 22, 2014

(54) SYSTEM AND METHOD FOR SECURING CONTROLLERS

(75) Inventors: David Richard Socky, Roanoke, VA (US); Robert James Boring, Greer, SC (US); Roy Leguire Jackson, Salem, VA (US); Timothy David Rian, Simpsonville, SC (US); William Robert Pettigrew, Christiansburg, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/460,759

(22) Filed: Apr. 30, 2012

(65) Prior Publication Data

US 2013/0290706 A1 Oct. 31, 2013

(51) Int. Cl.
*H04L 29/06* (2006.01)
*H04L 9/32* (2006.01)
*G06F 7/04* (2006.01)
*G06F 12/14* (2006.01)

(52) U.S. Cl.
USPC ............... 713/158; 713/166; 713/169; 726/4; 726/22

(58) Field of Classification Search
USPC .......................... 713/158, 166, 169; 726/4, 22
See application file for complete search history.

(56) References Cited

U.S. PATENT DOCUMENTS

| | | | | |
|---|---|---|---|---|
| 6,092,202 | A * | 7/2000 | Veil et al. | 726/27 |
| 2003/0016819 | A1* | 1/2003 | Cheng | 380/2 |
| 2008/0163182 | A1* | 7/2008 | Breault | 717/146 |
| 2008/0175388 | A1 | 7/2008 | Okabe et al. | |
| 2010/0146588 | A1* | 6/2010 | Bergerson et al. | 726/3 |
| 2012/0030761 | A1* | 2/2012 | Baba et al. | 726/23 |
| 2012/0198541 | A1* | 8/2012 | Reeves | 726/13 |
| 2012/0240212 | A1* | 9/2012 | Wood et al. | 726/10 |
| 2013/0139242 | A1* | 5/2013 | Zhu | 726/10 |

OTHER PUBLICATIONS

U.S. Appl. No. 13/460,721, filed Apr. 30, 2012, Sahoo et al.
U.S. Appl. No. 13/460,779, filed Apr. 30, 2012, Chong et al.
U.S. Appl. No. 13/460,794, filed Apr. 30, 2012, Chong et al.
U.S. Appl. No. 13/460,801, filed Apr. 30, 2012, Chong et al.
U.S. Appl. No. 13/460,771, filed Apr. 30, 2012, Pettigrew et al.

* cited by examiner

*Primary Examiner* — Aravind Moorthy
(74) *Attorney, Agent, or Firm* — Fletcher Yoder, P.C.

(57) ABSTRACT

A system includes a controller and a certificate authority. The controller is configured to control a process. The certificate authority (CA) is configured to issue and to revoke certificates, wherein the controller is configured to use the CA to mutually authenticate a user to enter into a secure mode of operation.

19 Claims, 4 Drawing Sheets

SYSTEM AND METHOD FOR SECURING CONTROLLERS

BACKGROUND OF THE INVENTION

The subject matter disclosed herein relates to systems and methods for securing devices, and more particularly, for securing controller devices.

Certain devices such as sensors, pumps, valves, and the like, may be controlled by a controller using pneumatic, hydraulic, and/or electrical signals. For example, a valve opening may be controlled based on a 4-20 mA signal from a controller. The controller may use a communications network to send and receive signals to and from the various devices. Unfortunately, the controller may be susceptible to use in an unauthorized manner or by unauthorized users. Accordingly, it may be beneficial to secure the controller.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a controller and a certificate authority. The controller is configured to control a process. The certificate authority (CA) is configured to issue and to revoke certificates, wherein the controller is configured to use the CA to mutually authenticate a user to enter into a secure mode of operation.

In a second embodiment, a non-transitory, tangible, machine-readable medium has executable code. The executable code includes instructions configured to authenticate a first user by using a first user certificate authority (CA) certificate. The first user is configured to be communicatively coupled to a first controller. If the first user CA certificate is not valid, then the instructions are configured to alert of a first security violation. However, if the first user CA certificate is valid, the instructions are configured to request and validate a CA certificate from a CA. Similarly, if the CA certificate is not valid, then the instructions are configured to alert of a second security violation. If the CA certificate is valid, then the instructions are configured to request a first controller CA certificate and enter a secure mode of operation.

In a third embodiment, a method includes receiving a request to enter a secure mode of operations and authenticating a user issuing the request by using a user certificate. The first user is configured to be communicatively coupled to a first controller. If the user is not authenticated, the method includes alerting of a first security violation. However, if the user is authenticated, the method includes requesting a certificate authority (CA) certificate from a CA server and determining if the CA certificate is valid. Similarly, if the CA certificate is not valid, then the method includes alerting of a second security violation. If the CA certificate is valid, then the method includes requesting a controller certificate from the CA server and entering the secure mode of operation.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
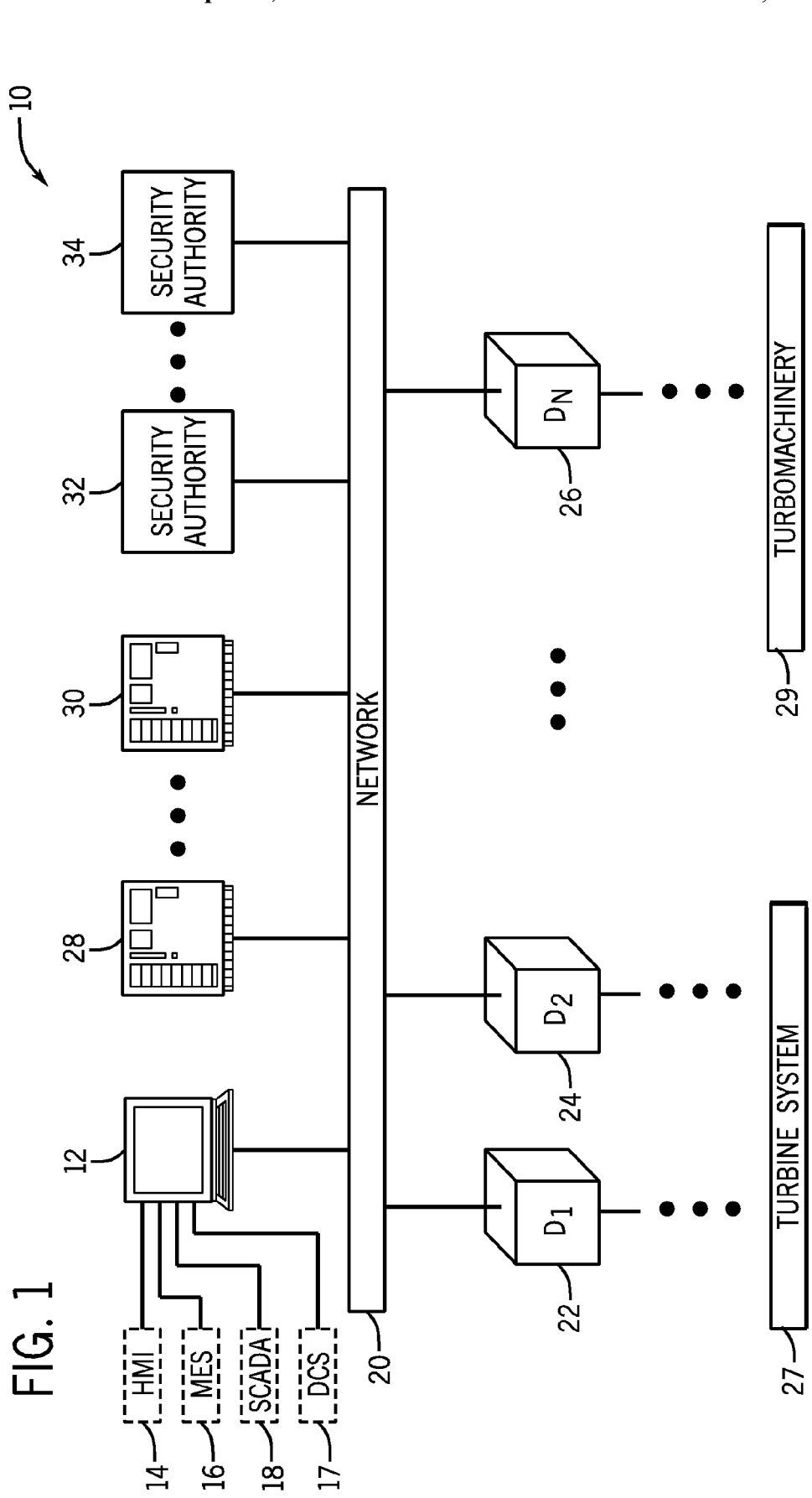
FIG. 1 is a schematic diagram of an embodiment of an industrial control system configured to secure controller devices, in accordance with aspects of the present disclosure.

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems and methods suitable for securing one or more controllers (e.g., industrial controllers) through the use of mutual authentication (e.g., two-way authentication). By providing for mutual authentication, a user, such as a plant operator or plant engineer communicating with a controller through a network, may substantially confirm the controller's identity. In a reciprocal manner, the controller communicating with the plant operator or plant engineer may ascertain the identity of the user. The mutual authentication may also provide for a role based access (RBA), such that the interactions between the controller and the user are restricted to desired interactions. For example, the interactions may be restricted to read-only interactions, write-only, or a combination thereof, based on a user role (e.g., system administrator, operator, commissioning engineer, or programmer).

In certain embodiments, mutual authentication may be provided through the novel use of a certificate authority (CA), including a secure, facility-based CA, such as a CA server designed to reside in an industrial plant. A locally administered CA may establish a review and approval process through a registration authority function in the CA server. The review and approval process may establish a unique set of trusted users and devices that can communicate using a secure network. In other embodiments, the CA may include an external CA server provided by a third-party authentication service, such as servers provided by VeriSign, of Reston, Va. In yet other embodiments, any two-factor authentication (TFA)

service may be used, including but not limited to token systems, key systems, one-time pad systems, challenge-response systems, and the like.

Further, mutual authentication may be performed at various times during controller operation. For example, the user may request a controller to enter a secure mode, so that the controller may be secured to prevent unauthorized use. Before the controller enters the secure mode, the user and the controller may mutually authenticate each other. Once in secure mode, before making changes to the controller process, the user and the controller may again mutually authenticate each other, to further secure the controller device and reduce the likelihood of unauthorized use of the controller.

Turning to FIG. 1, an embodiment of an industrial process control system 10 is depicted. A remote device 12 is configured to execute a variety of field device configuration and monitoring applications, and provides an operator interface through which an engineer or technician may monitor the components of the industrial process control system 10. The remote device 12 may be any type of computing device suitable for running software applications, such as a laptop, a workstation, a tablet computer, or a handheld portable device (e.g., personal digital assistant or cell phone). Indeed, the computer 12 may include any of a variety of hardware and/or operating system platforms.

In certain embodiments, the remote device 12 may host an industrial automation system, such as a human machine interface (HMI) system 14, a manufacturing execution system (MES) 16, a distributed control system (DCS) 17, and/or a supervisor control and data acquisition (SCADA) system 18. Further, the remote device 12 is communicatively connected to a network bus 20 suitable for enabling communication between the remote devices 12 and devices $D_1$ 22, $D_2$ 24, and $D_3$ 26. The devices 22, 24, and 26 may include field devices such as sensors, valves, actuators, and the like, suitable for use in industrial applications. In the illustrated embodiment, the devices 22, 24 are operatively coupled to a turbine system 27 to operate or control the turbine system 27. For example, the turbine system 27 may be a gas turbine, a steam turbine, a water turbine, or another suitable turbine system. In addition, the device 26 is operatively coupled to turbomachinery 29 to operate or control the turbomachinery 29, which may be a pump, compressor, or an expander. It is also to be noted that the devices 22, 24, and 26 may include devices suitable for use in residential applications, such as home automation applications. In the depicted embodiment, two controllers 28 and 30 are also connected to the bus 20. The controllers 28, 30 may use the bus 20 for communicating with and controlling any one of the devices 22, 24, 26. For example, the controllers 28, 30 may reside in an industrial plant and may be configured to adjust one or more process conditions related to the devices 22, 24, 26. The bus 20 may be any electronic and/or wireless network suitable for enabling communications, and may include fiber media, twisted pair cable media, wireless communications hardware, Ethernet cable media (e.g., Cat-5, Cat-7), and the like. Further, the bus 20 may include several sub-buses, such as a high speed Ethernet sub-bus suitable for connecting system 10 components at communication speeds of 100 MB/sec and upwards. Additionally, the bus 20 may include an input/output (I/O) network, such as an I/O network conforming to the Institute of Electrical and Electronics Engineers (IEEE) 802.3 standard. The bus 20 may also include an H1 network sub-bus suitable for connecting system 10 components at communications speeds of approximately 31.25 Kb/sec. The sub-buses may intercommunicate with each other, for example, by using linking devices or gateways, such as those gateways available under the designation FG-100 provided by softing AG, of Haar, Germany, and/or I/O packs available from General Electric Co. of Schenectady, N.Y. Indeed, a number of interconnected sub-buses of the bus 20 may be used to communicate amongst the components of the system 10.

Additionally, two security authorities (e.g., certificate authorities) 32, 34 or servers providing for CA are connected to the bus 20. As illustrated, the security authorities 32, 34 may use the bus 20 for communicating with any of the devices 22, 24, 26, the remote device 12, or the controllers 28, 30. In particular, the security authorities 32, 34 may issue and revoke certificates among the control system 10 to secure the controllers 28, 30 through the use of mutual authentication. In certain embodiments, the number of security authorities 32, 34 may vary. For example, the control system 10 may have 1, 2, 3, 4, or more security authorities 32, 34. Further, as discussed above, the security authorities 32, 34 may be a third-party security authority or may reside in the same area as the controllers 28, 30 (e.g., in an industrial plant).

Certificates may be electronic documents that use digital signatures to verify the identity of a certificate holder. In certain embodiments, the certificate holders may be the remote device 12; the bus 20; the devices 22, 24, 26; the controllers 28, 30; the security authorities 32, 34; and/or some combination thereof. It may be desirable for the various components of the control system 10 to verify each other's identities using mutual authentication or other security techniques (e.g., two-factor authentication). For example, the remote device 12 may request a change in the process conditions of an industrial plant. Before the controllers 28, 30 implement the requested change, the controllers 28, 30 may verify the identity of the remote device 12. This authentication may reduce or eliminate the likelihood of unauthorized use of the remote device 12 and/or the controllers 28, 30. In addition, the remote device 12 may verify the identities of the controllers 28, 30 to further improve the security of the control system 10. In general, mutual authentication may refer to a first certificate holder (e.g., remote device 12) verifying the identity of a second certificate holder (e.g., controllers 28, 30), and reciprocally, the second certificate holder subsequently verifying the identity of the first certificate holder. Accordingly, mutual authentication may reduce the likelihood of unauthorized use of the control system 10.

It is to be noted that the industrial process control system 10 depicted in FIG. 1 is greatly simplified for purposes of illustration. The number of components is generally many times greater than the number of depicted components. This is especially the case with regard to the number of depicted devices 22, 24, and 26. Indeed, in an industrial environment, the number of devices may number in the hundreds for the industrial process control system 10. Accordingly, the scope of the control system 10 may vary based on the location in which it is implemented. In certain embodiments, the control system 10 may be installed in a home, and the number of components may be less than the number depicted in FIG. 1.

Figure 2:
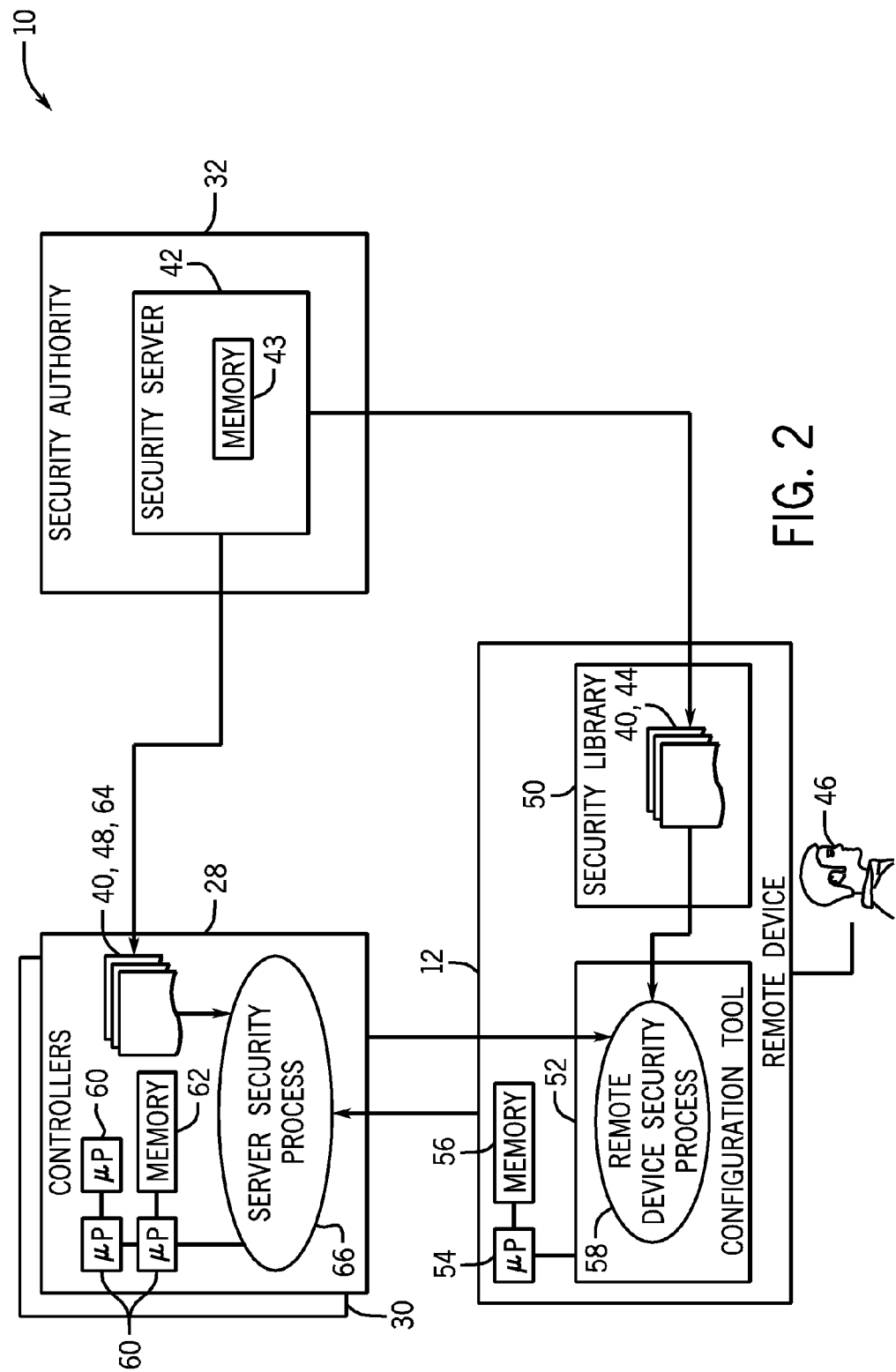
FIG. 2 is a block diagram of an embodiment of the industrial control system of FIG. 1, illustrating the communication between controller devices, a remove device, and a security authority.

FIG. 2 is a block diagram of an embodiment of the control system 10 including the controllers 28, 30, the remote device 12, and the security authority 32 communicatively coupled to operate securely using mutual authentication. The security authority 32 may issue and revoke certificates 40 among the components of the control system 10. As shown, the security authority 32 includes a security server 42 (e.g., certificate authority server) that may manage the certificates 40. For example, the security server 42 may include software instructions to generate the certificates 40 using various cryptographic hash algorithms, such as SHA-1. The software instructions may be stored in a non-transitory machine-readable medium, such as a memory 43 of the server 42. As discussed previously, the security authority 32 may be a third-party authentication service, or the security authority 32 may reside within an industrial plant. In the latter case, it may be desirable for the security authority 32 to connect to the bus 20 and manage the certificates 40 without connecting to the Internet or other outside network, as this may further secure the control system 10. Additionally, the security authority 32 may use a variety of open source or third party implementations of certificate authentication software, such as OpenCA, Enterprise Java Bean Certificate Authority (EJBCA), OpenSSL, X Certificate (XCA), or a combination thereof.

As illustrated, the security server 42 is configured to communicate with the remote device 12 and the controllers 28, 30. The security server 42 may issue and revoke user certificates 44 that may be used to identify a user 46 of the remote device 10. The security server 42 may also issue and revoke controller certificates 48 that may be used to identify the controllers 28, 30. In addition, the user and controller certificates 44, 48 may include attributes to enable a role-based access. For example, the user 46 may be assigned a plant operator role, a plant engineer role, a commissioning engineer role, a programmer role, or a system administrator role. The interactions of the user 46 with the remote device may be partially restricted based on the assigned role, and the assigned role may be contained in the user certificates 44 or the controller certificates 48. As discussed above, the interactions may be restricted to read-only interactions, write-only interactions, or some combination thereof. For example, a plant operator may be restricted to read-only interactions, while a system administrator may have access to read and write interactions. As illustrated, the controller certificates 48 may be stored within the controllers 28, 30, and the user certificates 44 may be stored in a security library 50 of the remote device 12.

The remote device 12 may include a configuration tool 52 that may communicate with the security library 50 and the controllers 28, 30 to operate securely using mutual authentication. The configuration tool 52 may be used as an interface between the user 46 and the remainder of the control system 10. For example, the user 46 may request a change in a process condition via the configuration tool 52, and if the user 46 and the user's role are authorized to make the change, the configuration tool 52 may change the process condition setpoint on the controllers 28, 30. To this end, the remote device 12 may include one or more processors 54 and/or other data processing circuitry, such as memory 56, to execute software instructions used to authenticate the user certificates 44 and the controller certificates 48. These instructions may be encoded in software programs that may be executed by the one or more processors 54. Further, the instructions may be stored in a tangible, non-transitory, computer-readable medium, such as memory 56. Memory 56 may include, for example, random-access memory, read-only memory, hard drive(s), and/or optical discs. In certain embodiments, the instructions stored in the memory 56 may be configured to communicate with the controllers 28, 30 to enable mutual authentication between the remote device 12 and the controllers 28, 30. Further, this communication may be secured to further increase the security of the control system 10 using secure socket layer (SSL), transport layer security (TLS), or another suitable cryptographic protocol. For example, the one or more processors 54 and memory 56 may implement a remote device security process 58 to validate the user certificate 44 and controller certificate 48.

As illustrated, the controllers 28, 30 may also include one or more processors 60 and memory 62. As discussed previously, the processors 60 and memory 62 may execute software instructions to authenticate the user certificate 44, controller certificate 48, or a security authority certificate 64. These software instructions may implement a server security process 66 to validate the aforementioned certificates. In certain embodiments, the controllers 28, 30 may be redundant controllers having two or more processors. For example, the controllers 28, 30 may be triple modular redundant (TMR) controllers having three processors 60. The three processors 60 may be configured to provide redundant operations. For example, each of the three processors 60 may independently implement the server security process 66 and validate the certificates 40. In one embodiment, all three processors may independently implement the server security process 66 and validate the certificates 40. In another embodiment, the processor currently acting as a master processor may be the only processor implementing the server security process 66 and validate the certificates 40. In yet another embodiment, two of the three processors may independently implement the server security process 66 and validate the certificates 40.

The result of the server security process 66 may be compared among the three processors 60. By doing so, undesired behavior in the three processors 60 may be corrected. For example, the three processors 60 may be arranged in a two-out-of-three voting arrangement. An error by a single processor 60 may be overridden by the results of the two remaining processors 60. This may result in a more fault-tolerant server security process 66. In other embodiments, the controllers 28, 30 may be dual controllers arranged in a two-out-of-two voting arrangement. In yet other embodiments, the controllers 28, 30 may be single controllers, or some combination of single, dual, and TMR controllers. As described further below, the server security process 66 and/or the remote device security process 58 may implement mutual authentication, which may reduce the likelihood of unauthorized interactions with the control system 10.

Figure 3:
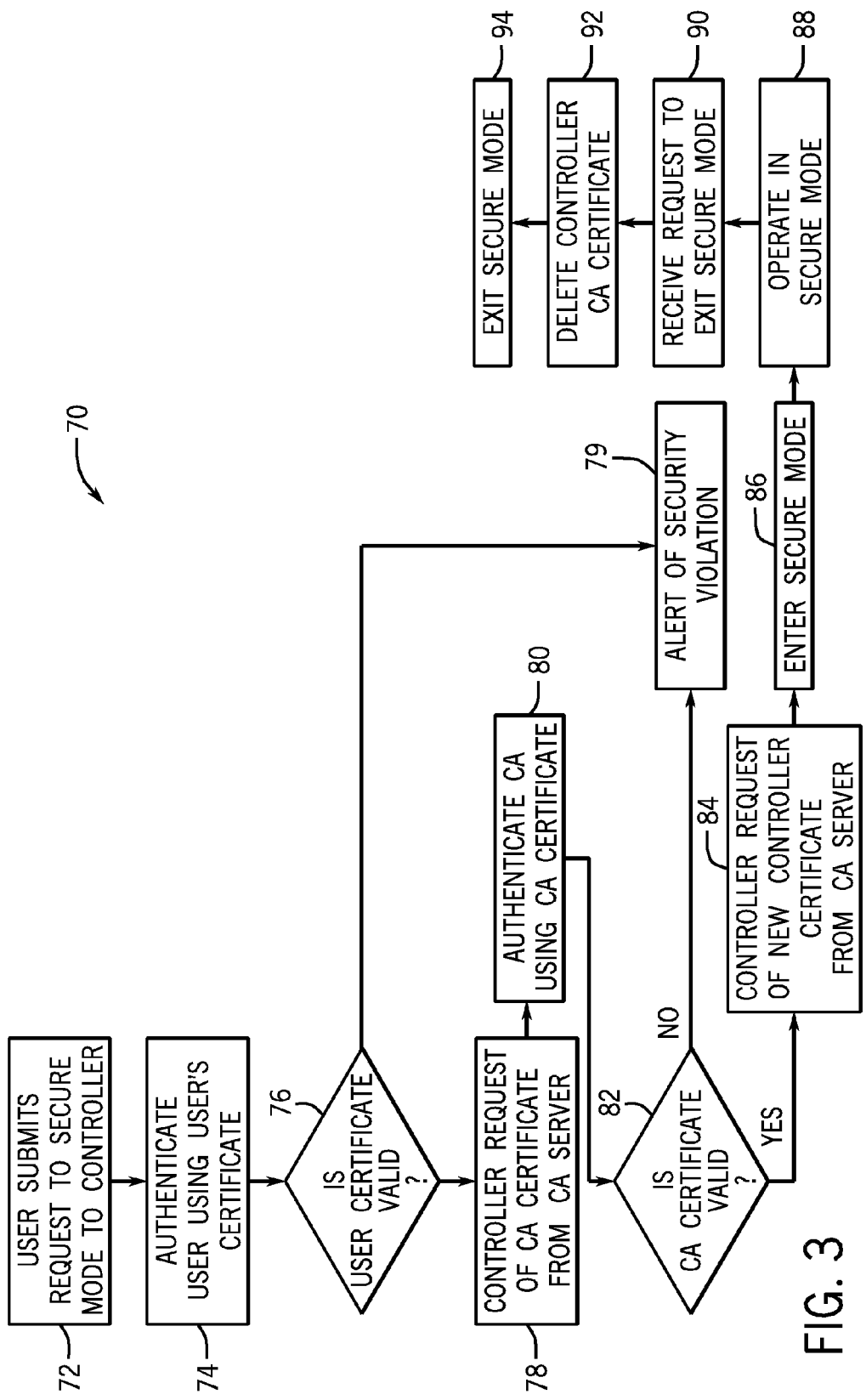
FIG. 3 is a flowchart of an embodiment of a process to enter a secure mode of operations to secure the control system of FIG. 1.

FIG. 3 is a flowchart of an embodiment of a process 70 used to secure the controllers 28, 30 by using mutual authentication. The process 70 may be performed partially or entirely by the remote device security process 58, the server security process 66, or a combination thereof. The user may submit (block 72) a request for the controllers 28, 30 to enter a secure mode, so that the user may make changes to the control system 10. In response, the remote device security process or thread 58 may authenticate (block 74) the user certificate 44 of the user 46. The user certificate 44 may be provided by the user 46. Additionally or alternatively, the user certificate may be retrieved from the security library 50 of the remote device 12. The remote device security process 58 may then determine (decision 76) if the user certificate 44 is valid. In determining (decision 76) if the user certificate 44 is valid, the remote device security process 58 may compare certain attributes of the user certificate 44 to a white list of allowed certificates within the security library 50. For example, if the user certificate 44 does not contain a correct public key (e.g., a public key of the controllers 28, 30), the user certificate may be invalid. Additionally or alternatively, if a signing hash of the user certificate 44 is not readable by the controllers 28, 30 using a public key of the security server 42, the user certificate 44 may be invalid.

If the remote devices security process 58 determines (decision 76) that the user certificate 44 is not valid, then the remote device security process 58 may alert (block 79) of a security violation. For example, the remote device security process 58 may alert (block 79) a system administrator of an unauthorized access attempt, raise an alarm, and/or log the security violation. The system administrator may then take corrective action to prevent future unauthorized attempts. It may be noted that the remote security process 58 may detail logging access events and access errors to a central logging device to provide auditable accounting and event records. However, if the user certificate 44 is valid (decision 76), then the controllers 28, 30 may request (block 78) the certificate authority (CA) certificate 64 from the security server 42. The server security process 66 may then authenticate (block 80) the security authority 32, thereby confirming the identity of the security authority 32 before accepting further certificates 40 from the security authority 32. Accordingly, the server security process 66 may determine (decision 82) if the CA certificate is valid.

If the CA certificate 64 is not valid (decision 82), then the server security process or thread 66 may alert (block 79) of the security violation, as discussed previously. However, if the CA certificate is valid (decision 82), the controllers 28, may request (block 84) the controller certificate 48 from the security server 42. Upon doing so, the controllers 28, 30 may establish a secure connection with the remote device 12. The secure connection may be made using, for example, SSL, TSL, or another suitable cryptographic protocol. The controllers 28, 30 may then enter (block 86) a secure mode of operation. In certain embodiments, the controllers 28, 30 may enter (block 86) the secure mode of operation only when a secure connection has been established with the configuration tool 52 of the remote device 12. Accordingly, the secure connection may reduce or eliminate the likelihood of unauthorized use or modification of the control system 10.

The controllers 28, 30 may continue to operate (block 88) in secure mode using mutual authentication, as will be discussed further below in FIG. 4. In certain embodiments, the controllers 28, 30 may continue to use the controller certificate 48 to authenticate future requests from the user 46. Eventually, the controllers 28, 30 may receive (block 90) a request to exit secure mode. In response, the controllers 28, may delete (block 92) the certificates, including the CA certificate 64 and the controller certificate 48. In addition, the controllers 28, 30 may request that the security authority 32 revokes its certificates 40, so these certificates 40 may not be reused. As a result, upon each request (blocks 78, 84) for the CA certificate 64 or the control certificate 48, the controllers 28, 30 may receive new certificates 48, 64. This may further increase the security of the control system 10, as the old certificates may not be used to access the control system 10. Indeed, all requests to enter the secure mode of operation may result in new certificates for the subsequent authentications. In other embodiments, the old certificates may be used during authentication. After deleting (block 92) the old certificates, the controllers 28, 30 may exit (block 94) the secure mode of operation. In certain embodiments, upon receiving (block 90) the request to exit secure mode, the controllers 28, 30 may again validate the user certificate 44 of the user 46. In doing so, the controllers 28, 30 may confirm that the user 46 is authorized to request (block 90) an exit from the secure mode. Accordingly, mutual authentication may be used to request (block 90) an exit from the secure mode. However, if the user 46 is not authorized to request (block 90) an exit from the secure mode, the controllers 28, 30 may continue to operate (block 88) in secure mode using mutual authentication, as described below in FIG. 4.

Figure 4:
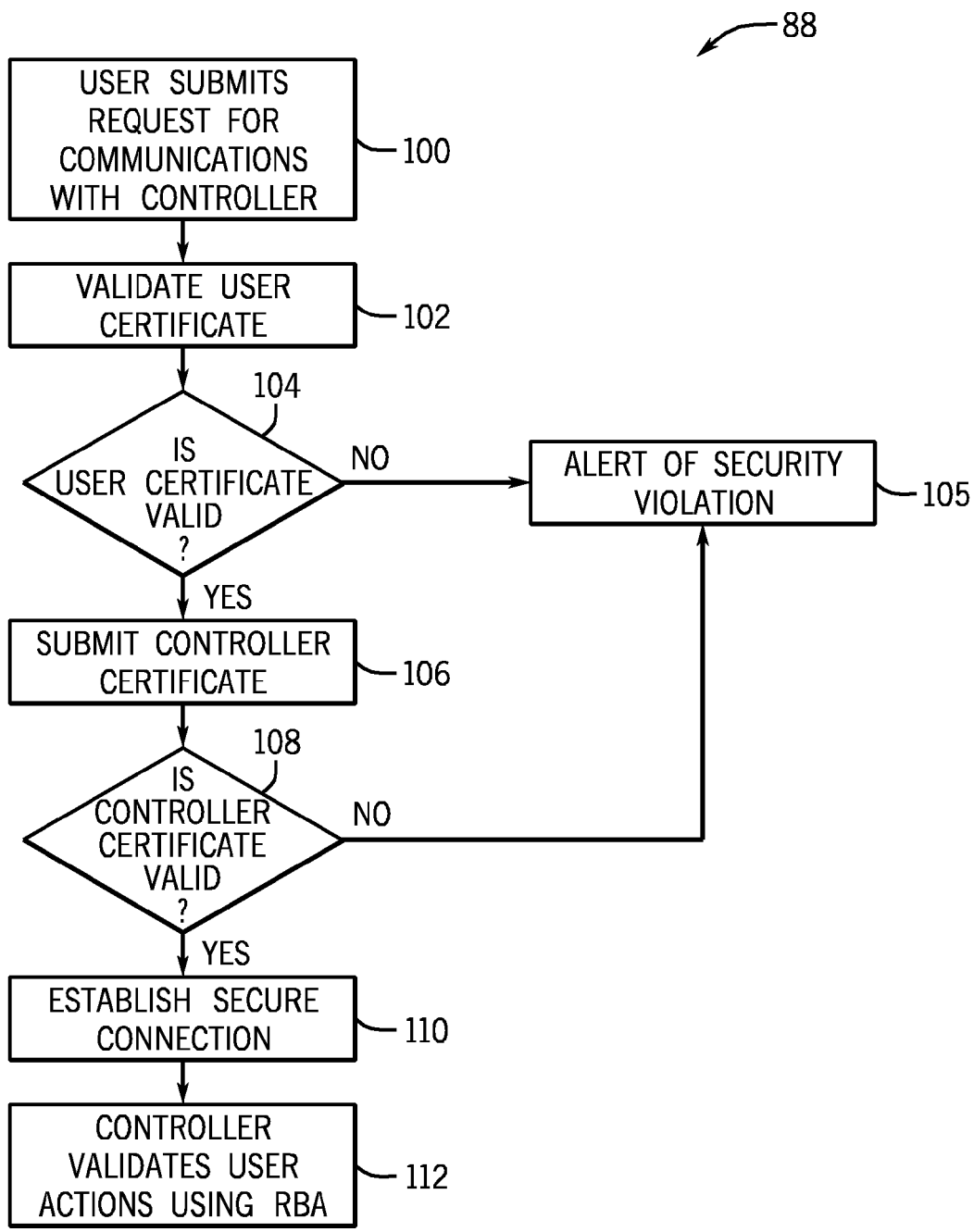
FIG. 4 is a flowchart of an embodiment of a process to operate in a secure mode using role-based access for the control system of FIG. 1.

FIG. 4 is a flowchart of an embodiment a process to operate the controllers 28, 30 in secure mode using mutual authentication. When the controllers 28, 30 are in secure mode, the user 46 may submit (block 100) a request for communications with the controllers 28, 30. The request may include a request to exit (block 94 shown in FIG. 3) the secure mode, a request to change the process conditions controlled by the controllers 28, 30, a request to change parameters of the controllers 28, 30, a request to update firmware for the controllers 28, 30, a request for reprogramming of the controllers 28, 30, or any other communication that may be made with the controllers 28, 30. In addition, the user 46 may submit the user certificate 44 as a part of submitting (block 100) the request for communications. Before implementing the request, the controllers 28, 30 may validate (block 102) the user certificate 44 of the user 46 to determine (decision 104) if the user certificate 44 is valid. If the user certificate 44 is not valid (decision 104), the controllers 28, 30 may alert (block 105) of a security violation. In certain embodiments, the security violations may be stored in the memory 62 of the controllers 28, 30 for later access by, for example, a system administrator. However, if the user certificate 44 is valid (decision 104), the controllers 28, 30 may then submit (block 106) the controller certificate 48 to the remote device 12. The remote device may determine (decision 108) if the controller certificate 48 is valid. If the controller certificate 48 is not valid (decision 108), the remote device 12 may alert (block 105) of a security violation. However, if the controller certificate 48 is valid, the controllers 28, 30 may establish (block 110) a secure connection with the remote device 12. As discussed previously, the secure connection may use SSL, TSL, or another suitable cryptographic protocol.

After establishing (block 110) the secure connection, the controllers 28, 30 may validate (block 112) the original request using role-based access. As noted above, the certificates 40 may include attributes that include a role and restrict interactions with the configuration tool 52 based on that role. While the controllers 28, 30 may be operating (process 88) in secure mode, they may continue to validate (block 102) the user certificate 44 using mutual authentication whenever a request is submitted (block 100). This may further increase the security of the control system, particularly when the user 46, and subsequently the user certificate 44, changes. For example, a plant engineer may submit (block 100) a request for communications, and may have read and write access based on the role information contained in the user certificate 44. At a later time, a plant operator may submit (block 100) a request for communications, and may have read-only access based on the user certificate 44. The continuous validation (blocks 102, 108, 112) may ensure that each user request is authorized before it is implemented.

Technical effects of the invention include systems and methods suitable for securing one or more controllers through the use of mutual authentication. By providing for mutual authentication, a user may substantially confirm the controller's identity. In a reciprocal manner, the controller may ascertain the identity of the user. Accordingly, mutual authentication may reduce the likelihood of unauthorized access or modification of the controllers. The mutual authentication may also include a role-based access to restrict the interactions between the user and the controller, as discussed above. In addition, the mutual authentication may be performed at various times during controller operation, such as upon receiving a request to operate in a secure mode, or upon receiving a request for communications while in secure mode.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
An industrial controller configured to control a process;
a certificate authority (CA) comprising a hardware server configured to issue and to revoke certificates, wherein the controller is configured to use the CA to mutually authenticate a user to enter into a secure mode of operation; and
a network bus, wherein the industrial controller is configured to communicate with the hardware server through the network bus, wherein the hardware server, the network bus, and the industrial controller are configured to be disposed in an industrial plant and wherein the industrial controller is configured to communicate with the hardware server via the network bus, and wherein in the secure mode of mode of operations the controller is configured to mutually authenticate all requests submitted to the controller.

2. The system of claim 1, wherein the industrial controller is configured to validate a user certificate provided by the user by using the CA; and if the user certificate is not valid, to alert of a first security violation; if the user certificate is valid, to request and validate a CA certificate from the CA; if the CA certificate is not valid, to alert of a second security violation; if the CA certificate is valid, to request a new controller certificate from the CA and then to enter into the secure mode of operation.

3. The system of claim 2, wherein the industrial controller is configured to delete the new controller certificate when exiting the secure mode of operation.

4. The system of claim 1, comprising a remote device having a non-transitory machine-readable storage medium comprising instructions configured to communicate with the industrial controller over a secure connection by using secure socket layer (SSL), transport layer security (TLS), or a combination thereof; and wherein industrial controller comprises a first certificate and the remote device comprises a second certificate, and wherein the CA is configured to authenticate the industrial controller to the remote device and to authenticate the remote device to the industrial controller by using the first and the second certificates.

5. The system of claim 4, wherein the secure mode of operation is configured to use a role based access to restrict an interaction between the industrial controller and the user, and wherein the interaction comprises the user interacting with the industrial controller via the remote device.

6. The system of claim 5, wherein the role based access comprises a plant operator role, a plant engineer role, a system administrator role, a commissioning engineer role, a programmer role, or a combination thereof.

7. The system of claim 1, wherein the industrial controller comprises a redundant controller having a plurality of processors.

8. The system of claim 1, wherein the CA comprises a OpenCA, Enterprise Java Bean Certificate Authority (EJBCA), OpenSSL, X Certificate (XCA), or a combination thereof.

9. A non-transitory machine-readable medium comprising executable code, the executable code comprising instructions configured to:
communicatively couple a first industrial controller to a certificate authority (CA) to enable communications between the first industrial controller and the CA via a network bus;
authenticate a first user configured to be communicatively coupled to the first industrial controller by using a first user CA certificate;
if the first user CA certificate is not valid, then alert of a first security violation;
if the first user CA certificate is valid, then request and validate a CA certificate from a CA;
if the CA certificate is not valid, then alert of a second security violation; and
if the CA certificate is valid, then request a first controller certificate, and enter a secure mode of operation, wherein the CA, the network bus, and the industrial controller are configured to be disposed in an industrial plant and wherein the industrial controller is configured to communicate with the CA via the network bus, and wherein in the secure mode of mode of operations the controller is configured to mutually authenticate all requests submitted to the controller.

10. The non-transitory tangible machine-readable medium of claim 9, comprising instructions configured to:
receive a request to exit the secure mode of operation;
authenticate the request;
if the request is authenticated, delete the first controller certificate; and
exit the secure mode of operation.

11. The non-transitory tangible machine-readable medium of claim 10, wherein the instructions configured to delete the first controller certificate comprise instructions to instruct the CA to revoke the first controller certificate.

12. The non-transitory tangible machine-readable medium of claim 9, comprising instructions configured to:
authenticate a second user by using a second user CA certificate;
if the second user is not authenticated, then alert of a third security violation;
if the second user is authenticated, then submit the first controller certificate;
validate the first controller certificate; and
when the first controller certificate is valid, establish a secure connection between the second user and the first industrial controller, wherein the first user is different from the second user.

13. The non-transitory tangible machine-readable medium of claim 12, comprising instructions configured to:
use a role based access to validate a controller command issued by the first user, the second user, or a combination thereof.

14. The non-transitory tangible machine-readable medium of claim 13, wherein the instructions configured to use the role based access comprise instructions configured to check a first user role of the first user, a second user role of the second user, or a combination thereof, to determine if the first user role, the second user role, or a combination thereof, is configured to issue the controller command.

15. A method comprising:
communicatively coupling an industrial controller to a certificate authority (CA) to enable communications between the industrial controller and the CA via a network bus;
receiving a request to enter a secure mode of operation;
authenticating a user configured to be communicatively coupled to a first controller and issuing the request by using a user certificate;

if the user is not authenticated, then alerting of a first security violation;
if the user is authenticated, then requesting a certificate authority (CA) certificate from a CA server;
determining if the CA certificate is valid;
if the CA certificate is not valid, then alerting of a second security violation;
if the CA certificate is valid, then requesting a controller certificate from the CA server and entering the secure mode of operation, wherein the CA, the network bus, and the industrial controller are configured to be disposed in an industrial plant and wherein the industrial controller is configured to communicate with the CA via the network bus, and wherein in the secure mode of mode of operations the controller is configured to mutually authenticate all requests submitted to the controller.

16. The method of claim 15, wherein the industrial controller comprises a triple modular redundant (TMR) controller, wherein receiving the request, authenticating the user, alerting of the first and of the second security violation, requesting the CA certificate, determining if the CA certificate is valid, and requesting the controller certificate, is performed by the TMR.

17. The method of claim 15, comprising using the CA to issue the user certificate, the CA certificate, the controller certificate, or a combination thereof.

18. The method of claim 15, wherein entering the secure mode of operation comprises establishing a secure connection configured to use a role based access to validate a controller command issued by the user.

19. The method of claim 18, wherein the secure connection is configured to use secure socket layer (SSL), transport layer security (TLS), or a combination thereof.

* * * * *